Nov. 24, 1953      G. R. STIBITZ      2,660,064
MECHANICAL DIFFERENTIAL
Filed Aug. 20, 1951
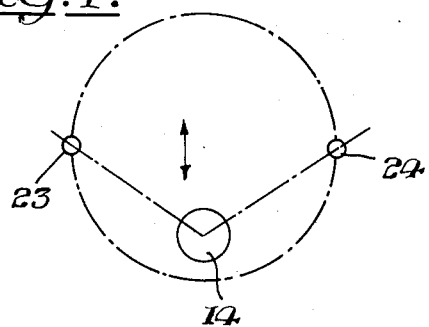
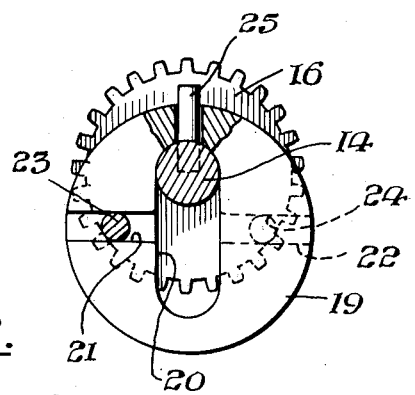
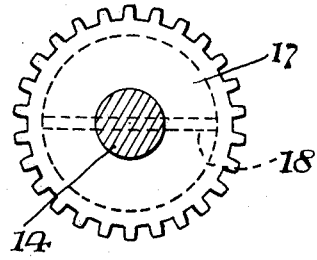
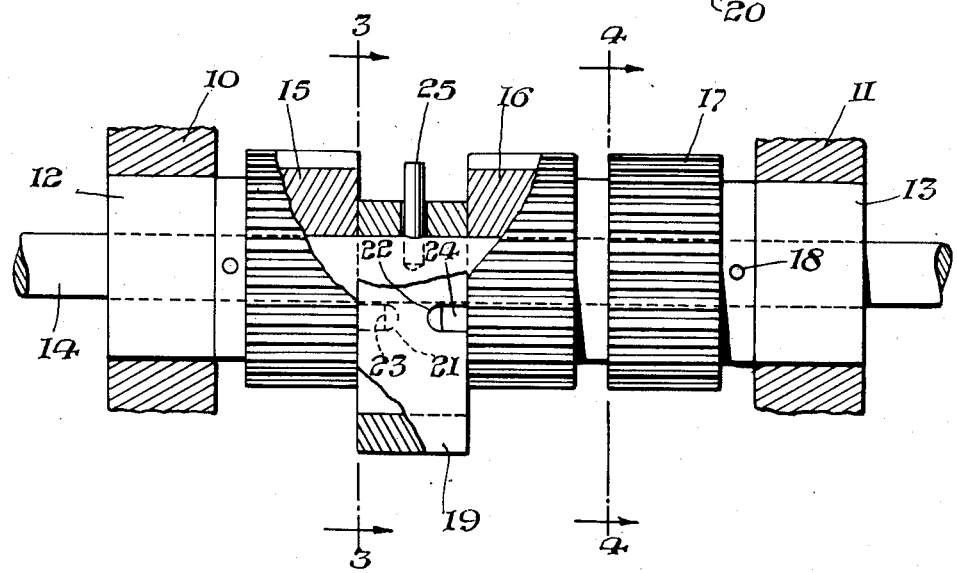
Inventor:
George R. Stibitz
by his Attorneys,
Darby & Darby Patented Nov. 24, 1953

2,660,064

UNITED STATES PATENT OFFICE 2,660,064

MECHANICAL DIFFERENTIAL

George R. Stibitz, Burlington, Vt.

Application August 20, 1951, Serial No. 242,661

1 Claim. (Cl. 74—1)

This invention relates to differential mechanism capable of varied uses including for example use as a component of a computing machine.

One object of this invention is to provide a mechanical differential having the characteristics of accuracy with low inertia.

An important object of this invention is to provide a rotatable member in the form, for example of a shaft which carries a member that is free to slide radially on the shaft but is restrained angularly so as to cause rotation of the shaft. This sliding member has two co-linear slots formed therein exactly at right angles to its direction of movement. A pair of input members are freely rotatable on the shaft but are provided with pins of equal diameter which slide in the co-linear slots. The sliding member is connected to the shaft by means of a pin which permits it to have radial movement with respect to the shaft. The input members may be of any suitable form, as for example gears, by means of which the factors to be put into the mechanism are converted into rotation of the gears on the shaft. As will be apparent these gears are only connected to the shaft by means of the sliding engagement of their pins in co-linear slots with the result that the member carrying these slots is given conjoint radial and circumferential motion, which motion is imparted to the shaft which can be thought of as an output shaft, the motion of which is representative of the differential motion of the input members.

Analysis of this mechanical combination reveals that the differential motion between the input members and the output member is represented by the mathematical function $$\frac{a+b}{2}$$

The limitation of this mechanism is that it can only be used if $a-b$ is limited to approximately plus or minus 60° of rotation of the output shaft. Notwithstanding this limitation there are useful applications for a differential of this type, including use in computing machines.

In the accompanying drawings,

Figure 1 is a geometrical illustration of the relative position of the output shaft and the input pin;

Figure 2 is an elevational view with some parts broken away of the mechanism of which the differential is a part;

Figure 3 is a cross-sectional view taken on the line 3—3 of Figure 2; and

Figure 4 is a cross-sectional view taken on the line 4—4 of Figure 2.

At 10 and 11 are diagrammatically illustrated suitable fixed bearing houses in which the output shaft is rotatably mounted by any suitable form of bearing members 12 and 13. The output shaft 14 journaled in these bearings carries between them an assembly of parts consisting of the gears 15 and 16 which are freely rotatable upon the shaft 14 and unattached thereto except as hereinafter explained. A third gear 17 is attached to the shaft 14 by means of a pin 18 so that the two must rotate together. Lying between the gears 15 and 16 is a sleeve 19 which has a passageway 20 therethrough symmetrically arranged with respect to the center of the sleeve. The passageway 20 has a width so that it has a free sliding fit on the shaft 14. Likewise, it is elongated as shown to permit radial movement of the sleeve 19 in either direction along the transverse axis of the passage 20.

A pair of co-linear slots 21 and 22 are formed on the opposite faces of the sleeve 19 so as to extend in a direction at right angles to the transverse axis of the passage 20, as clearly shown in Figure 3. Each slot extends inwardly from the periphery of the sleeve until it intersects with the passage 20 at its opposite ends. Attached to the face of the gear 15, adjacent the sleeve 19, is a pin 23 which projects into the slot 21 and may have sliding movement therein. Similarly, a pin 24 is attached to the face of the gear 16 adjacent the sleeve 19 so as to project into the slot 22. A pin 25, extending at right angles to the co-linear slot 21—22, is mounted in the shaft 14 and projects through a radial passage in the sleeve 19 so that the sleeve can slide thereon, but any rotational movement thereof will be imparted to the shaft 14.

As suggested above, the shaft 14 can be considered to be the output member, the gears 15 and 16 can be considered to be rotatable input members, and the pins 23 and 24 can be considered to be the input pins.

In the operation of this device, if one of the gears 15 or 16 is moved through an angle $a$ and the other is moved through an angle $b$, the shaft 14 will be rotated through an angle equal to $$\frac{a+b}{2}$$

within the limitation as explained that $a$ minus $b$ is limited to plus or minus 60° of rotation for shaft 14. This comes about from the fact that the rotation of the gears 15 and 16 on the shaft 14 will impart a combined radial and circumferential movement to the sleeve 19 which by reason of its connection to the shaft 14 by the pin 25, will cause the shaft 14 to rotate an amount as stated above.

With reference to Figure 1, it will be clear that with the mechanical arrangement of parts explained, the output shaft 14 geometrically always lies in symmetrical relation to the input pins 23 and 24 for all positions thereof. The double headed arrow in this figure indicates the radial sliding component of movement of the sleeve 19 imparted to it by the rotation of the gears 15 and 16.

Those skilled in this art will appreciate that the specific form of mechanism herein illustrated for the purpose of disclosing this invention, is capable of modification in a number of respects, and for this reason it is not desired that the appended claim be limited to the exact mechanism disclosed. In this connection it will be noted that the gears 15, 16 and 17 and the sleeve 19 are arranged on the shaft 14 with respect to the bearings so as to hold all the parts in face to face relation while permitting relative movement, as explained above. It is obvious that this specific method of so confining the parts may be readily varied.

It is also noted that the input members 15 and 16 do not necessarily need to be gears, nor does the output member 17 need necessarily to be a gear. By way of example, any device to be operated by the output shaft might be directly connected thereto rather than by means of the gear 17. These suggestions are by way of example only.

What is claimed is:

A differential mechanism as disclosed, comprising a rotatable output shaft, a pair of rotatable input members journaled on said shaft, a sleeve lying between said input members having radial slots on opposite faces thereof, a pin mounted on each input member and engaging said slots respectively, and a pin intersecting said sleeve and secured to said shaft, whereby said sleeve may slide radially with respect to said shaft.

GEORGE R. STIBITZ.

References Cited in the file of this patent

UNITED STATES PATENTS

| Number | Name | Date |
|---|---|---|
| 353,721 | Wallenbeck | Dec. 7, 1886 |
| 885,203 | Sweet | Apr. 21, 1908 |
| 1,225,355 | Pogue | May 8, 1917 |
| 1,355,170 | Seeck | Oct. 12, 1920 |
| 1,364,745 | Gerber | Jan. 4, 1921 |
| 1,504,084 | Spencer | Aug. 5, 1924 |
| 1,803,458 | Berry | May 5, 1931 |
| 1,826,703 | Batts | Oct. 13, 1931 |
| 2,148,564 | Kuhns | Feb. 28, 1939 |
| 2,364,393 | Seeck | Dec. 5, 1944 |

FOREIGN PATENTS

| Number | Country | Date |
|---|---|---|
| 163,112 | Great Britain | May 11, 1921 |
| 72,612 | Germany | July 15, 1893 |